US008214174B2

(12) United States Patent
Ganapathy et al.

(10) Patent No.: US 8,214,174 B2
(45) Date of Patent: Jul. 3, 2012

(54) ALGORITHM FOR ONLINE ADAPTIVE POLARIZATION CURVE ESTIMATION OF A FUEL CELL STACK

(75) Inventors: Sriram Ganapathy, Rochester, NY (US); John P. Salvador, Penfield, NY (US); Balasubramanian Lakshmanan, Pittsford, NY (US); Frank Leo, Honeoye Falls, NY (US); Jason R. Kolodziej, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1356 days.

(21) Appl. No.: 11/669,898

(22) Filed: Jan. 31, 2007

(65) Prior Publication Data
US 2008/0182139 A1 Jul. 31, 2008

(51) Int. Cl.
*G06F 3/00* (2006.01)
*G06F 3/05* (2006.01)
*G06F 3/14* (2006.01)
*G06F 13/14* (2006.01)

(52) U.S. Cl. ......... 702/179; 702/182; 702/183; 702/186

(58) Field of Classification Search .............. 702/57–60, 702/63, 64, 179, 183; 250/341.1; 320/101; 429/22, 41
See application file for complete search history.

(56) References Cited

U.S. PATENT DOCUMENTS

| 5,879,828 | A | * | 3/1999 | Debe et al. ............. 429/41 |
| 6,020,584 | A | * | 2/2000 | Brarens et al. ......... 250/227.17 |
| 6,271,522 | B1 | * | 8/2001 | Lindermeir et al. ....... 250/341.1 |
| 6,624,636 | B2 | * | 9/2003 | Arai et al. .................. 324/426 |
| 6,756,141 | B2 | * | 6/2004 | Miller et al. ............... 429/22 |
| 6,777,122 | B2 | * | 8/2004 | Okamoto .................. 429/425 |
| 6,794,844 | B2 | * | 9/2004 | Hochgraf et al. .......... 320/101 |
| 7,124,040 | B2 | * | 10/2006 | Engelhardt et al. ........ 702/58 |
| 7,348,082 | B2 | * | 3/2008 | Kolodziej .................. 429/431 |

FOREIGN PATENT DOCUMENTS

| CN | 1635657 A | 7/2005 |
| JP | 2005-166601 A | 6/2005 |
| JP | 2005-322577 A | 11/2005 |

OTHER PUBLICATIONS

Http://comp.uark.edu/~jjrencis/femur/Learning-Modules/Linear-Algebra/mtxdef/transpose/transpose.html; Transpose of a matrix; Oct. 24, 2011; two pages*
http://programmedlessons.org/VewctorLessons/vmch13/vmch13_14.html; Transpose; Oct. 24, 2011, two pages.*
Hu Weihua et al., "Study on Electric Pressure Models of Proton Exchanging Film Fuel Cells", Automobile Technology, 2002 (10).

* cited by examiner

*Primary Examiner* — Michael Nghiem
*Assistant Examiner* — Felix Suarez
(74) *Attorney, Agent, or Firm* — John A. Miller; Miller IP Group, PLC

(57) ABSTRACT

An algorithm for determining a polarization curve of a fuel cell stack. When the fuel cell stack is running and certain data validity criteria have been met, the algorithm goes into a data collection mode where it collects stack data, such as stack current density, average cell voltage and minimum cell voltage. When the stack is shut down, the algorithm uses a cell voltage model to solve a least squares problem to estimate predetermined parameters that define the polarization curve. If the estimated parameters satisfy certain termination criteria, then the estimated parameters are stored to be used by a system controller to calculate the polarization curve of the stack.

27 Claims, 1 Drawing Sheet

ALGORITHM FOR ONLINE ADAPTIVE POLARIZATION CURVE ESTIMATION OF A FUEL CELL STACK

BACKGROUND OF THE INVENTION

1. Field of the Invention

This invention relates generally to an algorithm for calculating a polarization curve for a fuel cell stack and, more particularly, to an algorithm that estimates a polarization curve for a fuel cell stack online by collecting data when the stack is running, calculating two or more parameters from the collected data that are used to determine the polarization curve and storing the parameters in memory.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The stack controller needs to know the current/voltage relationship, referred to as a polarization curve, of the fuel cell stack to provide a proper distribution of power from the stack. The relationship between the voltage and the current of the stack is typically difficult to define because it is non-linear, and changes depending on many variables, including stack temperature, stack partial pressures and cathode and anode stoichiometries. Additionally the relationship between the stack current and voltage changes as the stack degrades over time. Particularly, an older stack will have lower cell voltages, and will need to provide more current to meet the power demands than a new, non-degraded stack.

Fortunately, many fuel cell systems, once they are above a certain temperature, tend to have repeatable operating conditions at a given current density. In those instances, the voltage can be approximately described as a function of stack current density and age.

SUMMARY OF THE INVENTION

In accordance with the teachings of the present invention, an algorithm is disclosed for an online and adaptive estimation of a polarization curve for a fuel cell stack. When the fuel cell stack is running and certain data validity criteria have been met, the algorithm goes into a data collection mode where it collects stack data, such as stack current density, average cell voltage and minimum cell voltage. When the stack is shut down, the algorithm uses a cell voltage model to solve a non-linear least squares problem to estimate predetermined parameters that define the polarization curve. If the estimated parameters satisfy certain termination criteria, then the estimated parameters are stored to be used by a system controller to calculate the polarization curve of the stack for future runs.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an algorithm for estimating the polarization curve for a fuel cell stack online is merely exemplary in nature, and is in no way intended to limit the invention or its applications or uses.

Figure 1:
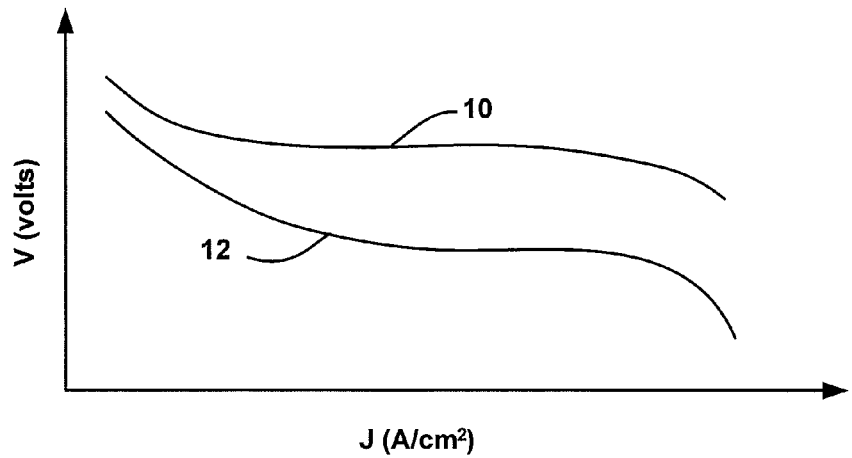
FIG. 1 is a graph with stack current density on the horizontal axis and stack voltage on the vertical axis showing the fuel cell stack polarization curve for a new stack and an older stack.

Many control parameters of a fuel cell system require knowledge of the polarization curve of the fuel cell stack, such as knowing the maximum voltage potential and current draw available from the fuel cell stack. As mentioned above, as the stack ages, the stack polarization curve also changes as a result of stack degradation. FIG. 1 is a graph with stack current density on the horizontal axis and average cell voltage on the vertical axis. Graph line 10 is a polarization curve for a new fuel stack and graph line 12 is a polarization curve for an aged fuel cell stack, where the average cell voltage is reduced for the same stack current density for the older stack. Therefore, it is necessary for the system to continually update the polarization curve for the stack so as to accurately determine the various control parameters for efficient fuel cell stack operation.

The present invention proposes an algorithm for calculating the polarization curve for the fuel cell stack online as the fuel cell system is being operated. As will be discussed in detail below, the algorithm estimates two or more stack parameters from collected data as the stack is being operated, and uses the parameters to calculate the polarization curve. In one non-limiting embodiment, the fuel cell system employs split stacks, where two polarization curves for each stack are simultaneously estimated. A first polarization curve is based on the average cell voltage and the stack current density for the first stack, a second polarization is based on the minimum cell voltage and the stack current density for the first stack, a third polarization curve is based on the average cell voltage and the stack current density for the second stack and a fourth polarization curve is based on the minimum cell voltage and the stack current density for the second stack.

Figure 2:
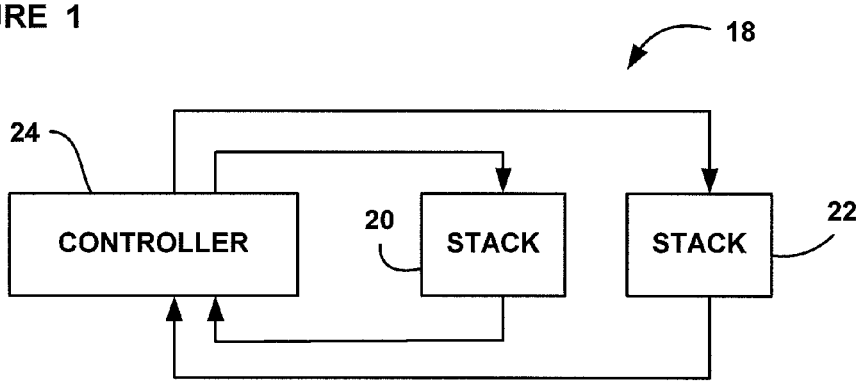
FIG. 2 is a block diagram of a fuel cell system including split stacks and a controller.

FIG. 2 is a block diagram of a fuel cell system 18 including a first split stack 20, a second split stack 22 and a controller 24. The controller 24 receives data from the split stacks 20 and 22, and the controller 24 controls the split stacks 20 and 22. The controller 24 uses the data to calculate the polarization curve of the stacks 20 and 22 in real time.

Figure 3:
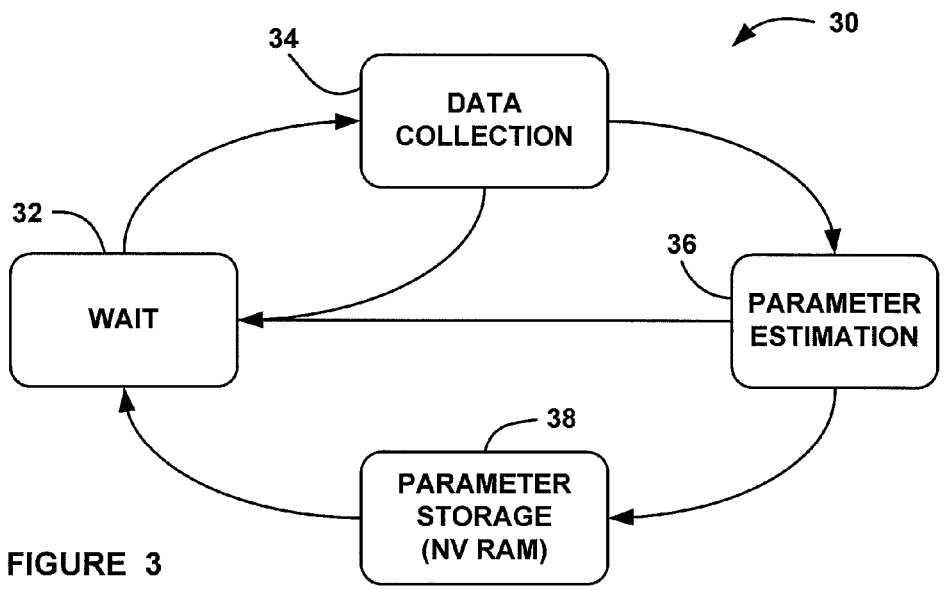
FIG. 3 is a flow chart diagram showing a process for an algorithm that estimates a polarization curve for a fuel cell stack online, according to an embodiment of the present invention.

FIG. 3 is a flow chart diagram 30 showing the operation of the algorithm for calculating the polarization curve of the fuel cell stacks 20 and 22 in the controller 24. At box 32, the algorithm waits for the fuel cell stacks 20 and 22 to operate and provide power. When the fuel cell stacks 20 and 22 provide power, and predetermined data validity criteria (DVC) has been met, then the algorithm moves to box 34 where the data used to estimate the polarization curves is collected as the stacks 20 and 22 are running. The data validity criteria can be any suitable data validity criteria, such as the temperature of the stack cooling fluid being above a predetermined temperature, stack relative humidity being above a predetermined threshold, etc. indicating that the system is running in a normal mode.

In the data collection mode, the algorithm will continually determine the stack current density and the voltages of the fuel cells in the fuel cell stacks 20 and 22. The fuel cell voltages are used to calculate an average cell voltage and a minimum cell voltage for the stacks 20 and 22. The possible stack current densities are separated into predetermined ranges. For each range, four bins are defined, which are represented as bins Y1-Y4 in Table I below for the current density ranges shown. The bin Y1 is a function of the average cell voltage for the first split stack 20, the bin Y2 is a function of the minimum cell voltage for the first split stack 20, the bin Y3 is a function of the average cell voltage for the second split stack 22 and the bin Y4 is a function of the minimum cell voltage for the second split stack 22. During the data collection state, each subsequent new value is stored in the bins after passing it through averaging filters. In addition, for each current range, a "valid" and a "count" value are stored. A 1 bit is put in the valid location if data is stored in any of the bins Y1-Y4 for that current density range and a 0 bit is put in the valid location if data is not stored in any of the bins Y1-Y4 for that current density range. The count location stores a value that identifies the number of times a value has been changed in any of the bins Y1-Y4 for the current density range.

TABLE I

| Current Density Range | Current Density | Y1 | Y2 | Y3 | Y4 | Count | Valid |
|---|---|---|---|---|---|---|---|
| 0.0285–0.0315 | 0.03 | | | | | | |
| 0.0333–0.0368 | 0.0350 | | | | | | |
| 0.0380–0.0420 | 0.0400 | | | | | | |
| ... | ... | | | | | | |
| 1.2450–1.2550 | 1.25 | | | | | | |

The algorithm also determines at box 34 whether the collected data is sufficient to satisfy predetermined data sufficiency criteria (DSC). In one non-limiting embodiment, the algorithm determines if the collected data is sufficient if one of the following two conditions is satisfied.

$CD_{R1}\_Lo <= CurrentDensity <= CD_{R1}\_Hi$, number of Valid bits > R1_V and count > R1_C $CD_{R2}\_Lo < CurrentDensity <= CD_{R2}\_Hi$, number of Valid bits > R1_V and count > R2_C The values $CD_{R1}\_Lo$, $CD_{R1}\_Hi$, $CD_{R2}\_Lo$, $CD_{R2}\_Hi$, R1_V, R1_C, R2_C, R2_V are predetermined calibration values. The following initial values can be used at the start of the data collection.

$CD_{R1}\_Lo = 0.525$ A/cm$^2$
$CD_{R1}\_Hi = 0.625$ A/cm$^2$
$CD_{R2}\_Lo = 0.625$ A/cm$^2$
$CD_{R2}\_Hi = 1.25$ A/cm$^2$
R1_V=(→7 bins have valid data in range R1)
R1_C=(→25 valid data points in range R1)
R2_C=1
R2_V=25

If the predetermined data sufficiency criteria have not been met, and the fuel cell stacks 20 and 22 are shut down, then the algorithm returns to the box 32.

After the fuel cell stacks 20 and 22 have been shut down and the data sufficiency criteria have been met, then the algorithm proceeds to box 36 to estimate the parameters that will be used to determine the polarization curves. In one non-limiting embodiment, a predetermined cell voltage model is used to determine the parameters as:

$$E_{cell} = E_{rev} - (i+a)*R_{HFR} - \left(0.07*\log_{10}\left(\frac{i+a}{i^0}\right) + c\log_{10}\left(1 - \frac{i}{i^\infty}\right)\right) \quad (1)$$

Where the following measurements are provided:
$E_{cell}$ = Cell voltage (V)
i = Current density (A/cm$^2$); and
$R_{HFR}$ = Cell HFR resistance measurement or from model (ohm cm$^2$).
The following assumed constants are provided:
$E_{rev}$ = Thermodynamic reversible cell potential (V); and
a = Background current density from Cell Shorting/Cell crossover (A/cm$^2$).
The following parameters are provided:
$i^0$ = Exchange current density (A/cm$^2$);
$i^\infty$ = Limiting current density (A/cm$^2$); and
c = Mass transfer coefficient.

For a system with very repeatable membrane humidification control, $R_{HFR}$ might be represented as a function of current density. Similarly, $E_{rev}$ might also be represented as a function of current density. This suggests that at each current density, the operating pressure, temperature, stoichiometry and humidification are sufficiently repeatable to use a simplistic term. In another embodiment, the average $R_{HFR}$ could be either measured or calculated at each count, and averaged in a separate column in Table I. The value $E_{rev}$ could be computed the same way, based on temperature and pressure data at each count.

The cell voltage model of equation (1) can be simplified by ignoring the constant a so that equation (1) becomes:

$$E_{cell} = E_{rev} - (i)*R_{HFR} - \left(0.07*\log_{10}\left(\frac{i}{i^0}\right) + c\log_{10}\left(1 - \frac{i}{i^\infty}\right)\right) \quad (2)$$

Rearranging the terms in equation (2) gives:

$$E_{rev} - (i)*R_{HFR} - E_{cell} = \left(0.07*\log_{10}\left(\frac{i}{i^0}\right) + c\log_{10}\left(1 - \frac{i}{i^\infty}\right)\right) \quad (3)$$

To provide the parameter estimation, the following variables are defined:

$y = E_{rev} - (i) * R_{HFR} - E_{cell}$
$x = i$
$\theta_1 = i^o$
$\theta_2 = i^\infty$
$\theta_3 = c$ Equation (3) can be represented in the following form:

$$y = F(x, \theta) \quad (4)$$

Thus, equation (3) can be represented as:

$$y = \left(0.07 * \log_{10}\left(\frac{x}{\theta_1}\right) + \theta_3 \log_{10}\left(1 - \frac{x}{\theta_2}\right)\right) \quad (5)$$

In equation (5), the input-output pair is (x,y) and the parameters to be estimated are $\theta = [\theta_1, \theta_2, \theta_3]^T$. For a given training set $G = x(i), y(i):(i=1,2,\ldots,M)$, a cost function to be minimized can be defined as:

$$J(\theta, G) = \frac{1}{2} \sum_{i=1}^{M} |y(i) - F(x(i), \theta)|^2 \quad (6)$$

By letting $\epsilon(i) = y(i) - F)(x(i), \theta)$, equation (6) becomes:

$$J(\theta, G) = \frac{1}{2} \sum_{i=1}^{M} \varepsilon(i)^T \varepsilon(i) = \frac{1}{2} \varepsilon(\theta, G)^T \varepsilon(\theta, G) \quad (7)$$

where T is the transpose of a matrix. Therefore, the parameter estimation solves a non-linear least squares problem so that the solution $\theta = [\theta_1, \theta_2\ \theta_3]^T$ minimizes $J(\theta,G)$.

The non-linear least squares problem can be solved using any suitable numerical method, such as a Gauss-Newton estimation with a Levenberg-Marquardt update method. The Gauss-Newton approach can be summarized by linearizing an error $\epsilon(\theta,G)$ at the current value of $\theta(k)$, where k is an iteration index, and solving the least squares problem to minimize the error value and estimate $\theta(k+1)$. In one embodiment, the computation is minimized by setting the value $\theta_2$ to a constant $\theta_c$ and estimating the other two parameters $\theta_1$ and $\theta_3$. However, this is by way of a non-limiting example in that all three of the parameters $\theta_1$, $\theta_2$ and $\theta_3$ can be estimated by the algorithm or any other suitable parameters.

In other embodiments, different techniques could be used to solve equation (7). For example, for stacks in which performance is insensitive to $i^\infty$, this parameter could be replaced with a constant. Then the parameters $i^o$ and c could be solved sequentially. The parameter $i^o$ could be solved by using data collected at low enough current density to minimize mass transport losses, but high enough to minimize the effect of permeation (0.05-0.1 A/cm$^2$). Then the resulting equation could be solved with the high current density data to obtain the parameter c.

The algorithm also determines whether the estimated parameters provide or exceed a predetermined estimation success criteria (ESC) at the box 36. Particularly, in one non-limiting embodiment, the calculated parameters must satisfy the equation:

$$\theta(k+1) - \theta(k))^T(\theta(k+1) - \theta(k)) \leq \omega \theta(k)^T \theta(k) \quad (8)$$

Where ω is a tunable parameter used to determine the steady state of the estimation and T is the transpose of a matrix.

The termination criteria are computed at the end of each estimate generated by the parameter estimation algorithm. Because there are four parameters being simultaneously estimated, each estimation generates a flag that is set only when its termination criteria is met. The estimated success criteria are set high only when all four estimations meet determination criteria. If the estimation success criteria have not been met, then the algorithm returns to the box 32 to wait for the fuel cell stacks 20 and 22 to start back up.

If the estimation success criteria have been met, then the algorithm stores the estimated parameters in a non-volatile random access memory (NV RAM) at box 38. The controller 24 can then access the NV RAM to get the current estimation parameters, which can then be used to calculate the polarization curve in a manner that is well understood to those skilled in the art. Once the estimation parameters are stored, then the algorithm returns to the box 32 for the next stack start-up.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for calculating a polarization curve for a fuel cell stack, said method comprising:
   collecting data from the fuel cell stack;
   providing a cell voltage model;
   determining whether predetermined data sufficiency criteria have been met before using the collected data to estimate predetermined parameters;
   estimating, using a controller configured to control the fuel cell stack, the predetermined parameters by solving a non-linear least squares problem using the cell voltage model and the collected data; and
   calculating the polarization curve, using the controller, based on the estimated parameters.

2. The method according to claim 1 further comprising determining whether predetermined data validity criteria have been met before collecting the data.

3. The method according to claim 2 wherein determining if the data validity criteria have been met includes determining whether a cooling fluid temperature within the stack is above a predetermined temperature or a stack relative humidity is above a predetermined value.

4. The method according to claim 1 wherein determining whether the predetermined data sufficiency criteria have been met includes determining whether the stack current density is within a certain range.

5. The method according to claim 1 further comprising determining whether the estimated parameters meet a predetermined estimation success criteria before the parameters are used to calculate the polarization curve.

6. The method according to claim 5 wherein determining whether the estimated parameters meet a predetermined estimation success criteria includes using the equation:

$$(\theta(k+1) - \theta(k))^T(\theta(k+1) - \theta(k)) \leq \omega \theta(k)^T \theta(k)$$

where θ is the estimated parameter, k is an iteration index, ω is a tunable parameter used to determine the steady state of the estimation, and T is a transpose of a matrix.

7. The method according to claim 1 wherein the cell voltage model is:

$$E_{cell} = E_{rev} - (i+a) * R_{HFR} - \left(0.07 * \log_{10}\left(\frac{i+a}{i^0}\right) + c\log_{10}\left(1 - \frac{i}{i^\infty}\right)\right)$$

where $E_{cell}$ is cell voltage, $E_{rev}$, is the thermodynamic reversible cell potential, i is current density, $R_{HFR}$ is cell HFR resistance, c is mass transfer coefficient, $i^0$ is exchange current density, $i^\infty$ is limiting current density and a is a constant.

8. The method according to claim 1 wherein using the cell voltage model and the collected data to solve a non-linear least squares problem to estimate predetermined parameters includes using a Gauss-Newton estimation with a Levenberg-Marquardt update method.

9. The method according to claim 1 wherein the estimated parameters include an exchange current density and mass transfer coefficient.

10. The method according to claim 1 wherein collecting data from the fuel cell stack includes collecting a current density of the fuel cell stack, an average cell voltage of fuel cells in the fuel cell stack and a minimum cell voltage of the voltages of the fuel cells in the fuel cell stack.

11. A non-transitory computer-readable storage medium with an executable program stored thereon, wherein the program instructs a controller to calculate a polarization curve for a fuel cell stack by performing the following steps:
    collecting a current density of the fuel cell stack, an average cell voltage of fuel cells in the fuel cell stack and a minimum cell voltage of the voltages of the fuel cells in the fuel cell stack;
    providing a cell voltage model;
    using the cell voltage model, the current density, the average cell voltage and the minimum cell voltage to solve a non-linear least squares problem to estimate predetermined parameters;
    determining whether predetermined data sufficiency criteria have been met before using the current density, the average cell voltage and the minimum cell voltage to estimate the parameters;
    using the estimated parameters to calculate the polarization curve; and
    determining whether the estimated parameters meet a predetermined estimation success criteria before the parameters are used to calculate the polarization curve.

12. The storage medium according to claim 11 wherein determining whether the predetermined data sufficiency criteria has been met includes determining whether the stack current density is within a certain range.

13. The storage medium according to claim 11 wherein determining whether the estimated parameters meet a predetermined estimation success criteria includes using the equation:

$$(\theta(k+1)-\theta(k))^T(\theta(k+1)-\theta(k)) \leq \omega\theta(k)^T\theta(k)$$

where θ is the estimated parameter, k is an iteration index, ω is a tunable parameter used to determine the steady state of the estimation, and T is a transpose of a matrix.

14. The storage medium according to claim 11 wherein the cell voltage model is:

$$E_{cell} = E_{rev} - (i+a) * R_{HFR} - \left(0.07 * \log_{10}\left(\frac{i+a}{i^0}\right) + c\log_{10}\left(1 - \frac{i}{i^\infty}\right)\right)$$

where $E_{cell}$ is cell voltage, $E_{rev}$, is the thermodynamic reversible cell potential, i is current density, $R_{HFR}$ is cell HFR resistance, c is mass transfer coefficient, $i^0$ is exchange current density, $i^\infty$ is limiting current density and a is a constant.

15. The storage medium according to claim 11 wherein using the cell voltage model and the collected data to solve a non-linear least squares problem to estimate predetermined parameters includes using a Gauss-Newton estimation with a Levenberg-Marquardt update method.

16. The storage medium according to claim 11 wherein the estimated parameters include an exchange current density and mass transfer coefficient.

17. A fuel cell system comprising:
    at least one fuel cell stack; and
    a controller configured to control the at least one fuel cell stack, said controller being programmed to:
        collect data from the fuel cell stack;
        determine whether predetermined data sufficiency criteria have been met before using the collected data to estimate predetermined parameters;
        estimate the predetermined parameters by solving a non-linear least squares problem using a cell voltage model and the collected data; and
        calculate at least one polarization curve for the at least one stack based on the estimated predetermined parameters.

18. The system according to claim 17 wherein the at least one stack is a first split stack and a second split stack and wherein the controller calculates a first polarization curve based on an average cell voltage and a stack current density for the first split stack, a second polarization based on a minimum cell voltage and the stack current density for the first split stack, a third polarization curve based on an average cell voltage and a stack current density for the second split stack and a fourth polarization curve based on a minimum cell voltage and the stack current density for the second split stack.

19. The system according to claim 17 wherein the controller determines whether predetermined data validity criteria have been met before collecting the data.

20. The system according to claim 19 wherein the controller determines that the data validity criteria have been met if a cooling fluid temperature within the stack is above a predetermined temperature or a stack relative humidity is above a predetermined value.

21. The system according to claim 17 wherein the controller determines that the predetermined data sufficiency criteria have been met if the stack current density is within a certain range.

22. The system according to claim 17 wherein the controller determines whether the estimated parameters meet a predetermined estimation success criteria before the parameters are used to calculate the polarization curve.

23. The system according to claim 22 wherein the controller uses the following equation to determine whether the estimated parameters meet the predetermined estimation success criteria:

$$(\theta(k+1)-\theta(k))^T(\theta(k+1)-\theta(k)) \leq \omega\theta(k)^T\theta(k)$$

where θ is the estimated parameter, k is an iteration index, ω is a tunable parameter used to determine the steady state of the estimation, and T is a transpose of a matrix.

24. The system according to claim 17 wherein the cell voltage model is:

$$E_{cell} = E_{rev} - (i+a)*R_{HFR} - \left(0.07*\log_{10}\left(\frac{i+a}{i^0}\right) + c\log_{10}\left(1 - \frac{i}{i^\infty}\right)\right)$$

where $E_{cell}$ is cell voltage, $E_{rev}$ is the thermodynamic reversible cell potential, i is current density, $R_{HFR}$ is cell HFR resistance, c is mass transfer coefficient, $i^0$ is exchange current density, $i^\infty$ is limiting current density and a is a constant.

25. The system according to claim 17 wherein the controller uses a Gauss-Newton estimation with a Levenberg-Marquardt update method to solve a non-linear least squares problem.

26. The system according to claim 17 wherein the estimated parameters include an exchange current density and mass transfer coefficient.

27. The system according to claim 17 wherein the collected data from the fuel cell stack includes a current density of the fuel cell stack, an average cell voltage of fuel cells in the fuel cell stack and a minimum cell voltage of the voltages of the fuel cells in the fuel cell stack.

\* \* \* \* \*